United States Patent [19]
Lamport

[11] Patent Number: 5,894,049
[45] Date of Patent: Apr. 13, 1999

[54] MANUFACTURE OF FRICTION MATERIAL USING FIBER ORIENTED PAPER

[75] Inventor: Robert Anthony Lamport, Centerville, Ohio

[73] Assignee: General Motors Corporation, Detroit, Mich.

[21] Appl. No.: 08/922,436

[22] Filed: Sep. 2, 1997

[51] Int. Cl.[6] ................................................ B29C 3/10
[52] U.S. Cl. .................... 264/258; 264/257; 264/640; 264/641; 264/642; 162/136; 162/165; 428/297.4
[58] Field of Search ................ 428/297, 302, 428/317.9, 319.1, 328, 331, 334, 340, 212, 219, 341, 297.4; 162/136, 164.4, 165; 264/257, 258, 640, 641, 642

[56] References Cited

U.S. PATENT DOCUMENTS

| | | |
|---|---|---|
| 3,891,595 | 6/1975 | Birchall .................................. 260/38 |
| 3,934,958 | 1/1976 | Turner ........................................ 9/6 |
| 4,256,801 | 3/1981 | Chuluda ................................. 428/280 |
| 4,279,696 | 7/1981 | Piersol ................................... 162/146 |
| 5,344,711 | 9/1994 | Kanzaki et al. ........................ 428/398 |
| 5,398,784 | 3/1995 | Haneda et al. ......................... 188/218 |
| 5,529,666 | 6/1996 | Yesnik ................................... 162/136 |
| 5,585,166 | 12/1996 | Kearsey ................................. 428/212 |
| 5,615,758 | 4/1997 | Nel ....................................... 192/113.31 |
| 5,662,855 | 9/1997 | Liew et al. ............................. 264/258 |

Primary Examiner—Merrick Dixon
Attorney, Agent, or Firm—George A. Grove

[57] ABSTRACT

An improved friction material may be made having reinforcing fibers aligned generally perpendicular to the friction surface of said material by forming a paper of fibrous friction materials such that the fibers in the paper are aligned closely to the longitudinal axis of the paper and then folding or cutting the paper into pleats or strips such that the pleats or strips are bonded together with the edges defining the friction surface of the friction body and the fibers perpendicular to that surface.

7 Claims, 1 Drawing Sheet

MANUFACTURE OF FRICTION MATERIAL USING FIBER ORIENTED PAPER

TECHNICAL FIELD

This invention pertains to methods of manufacturing friction materials such as disk brake friction pads and the like. More specifically, this invention pertains to a method of forming such a friction material from a paper of oriented fibers that is cut or folded and stacked to form the friction pad.

BACKGROUND OF THE INVENTION

Conventionally manufactured friction materials are produced by mechanically blending particulate friction-producing and lubricating additives, short fibers and thermosetting resin materials and then molding the mass under heat and pressure to form a finished brake pad or lining or the like. During molding of the mixed material, pressure is applied perpendicular to the broad face of the pad. This results in a high degree of fiber orientation generally parallel to what is to be the wear surface of the pad. This procedure and the resulting fiber orientation limits the friction and wear performance of the final pad due to material restriction and the inability to orient fibers in the optimal direction, which would often be perpendicular to the wear surface.

One of the primary limitations of friction materials is their thermal stability. On a conventional automotive disk brake pad, the wear surface temperature can exceed 700° C. The wear rate of the surface materials increases dramatically as the wear surface temperature rises above the decomposition temperatures of the fibers and/or the binder that joins them together. The fibrous constituents serve as both a reinforcement for the friction material and a bearing surface to increase wear life. Thus, it is desirable to incorporate fibers into the friction material with the decomposition temperature above 700° C. Such fibers include metallic, carbon, graphite, glassy and ceramic fibers. Except for the metallic fibers, all of these classes of potential friction material reinforcing fibers are intrinsically brittle, and they fracture with a loss of reinforcing capability when subjected to the mixing and molding pressures used to form friction materials by conventional processes.

Thus, conventional friction material processing does not allow the exploitation of the most thermally-resistant fibers due to breakage of the fibers and to their alignment in a least desirable orientation parallel to the wear surface. When the fibers are in line with the contact of the wear surface, they are readily pulled from the matrix when the binder wears away and exposes the length of the fiber. When the fiber is gone, there is additional binder wear and so forth. Thus, in the conventional friction material processing, the high temperature-resistant brittle fibers break and they are aligned in a direction not especially suitable to the integrity of the friction material.

In addition to the above problems, the conventional mixing of friction material formulations often lends itself to segregation of the materials so that the friction material is not uniform in its mixture, as would be most desirable.

Accordingly, it is apparent that alternative and improved practices for the making of friction materials would be useful. It is an object of the present invention to provide such a method.

SUMMARY OF THE INVENTION

In accordance with the practice of the invention, a method is provided in which the reinforcing fibers and, optionally, other friction material ingredients are formed into a continuous roll of paper or felt. Suitable fibers of the desired reinforcing material in the form of staple or pulp material as well as resin particulates and/or particulates and whiskers of other friction material ingredients are made into a slurry and formed into the paper by known paper-making practices. The drum speed, vacuum force, slurry viscosity and agitation and fiber length are all selected to maximize the fiber orientation within 45 degrees of the lengthwise or longitudinal direction of the paper strip.

The paper is then dried and cut into widths corresponding to the thickness of a desired brake pad. Alternatively, the paper is folded so that the distance between the folds represents the thickness of the brake pad. In either practice, the folded pleats or cut strips of the paper are stacked with the ends or pleats forming the wear surface of the brake pad. The preform is suitably temporarily held together by needle punching or stitching the stack perpendicular to the face of the sheets or immediately hot pressed or molded.

Thus, the faces of the strips of the original sheet constitute sections through the friction pad with the ends or edges constituting collectively the wear surface of the pad. Thus, the direction of the slitting or folding is controlled so that a majority of the original fibers are aligned perpendicular to the edges of the paper and thus to the intended friction surface of the brake pad.

Thermoset resin material may, of course, be incorporated into the paper as it is made or applied to the paper before the pleats or strips are pressed together. Additional friction material additives such as abrasive oxides and solid lubricant materials including graphite, calcium fluoride, antimony oxide and the like may also be mixed in particulate form with the resin and the paper. Thus, the final composition of the friction material can be like or different from that of standard friction materials. However, a significant improvement in the friction material made from paper as described is that the fibers of suitable length are aligned perpendicular to the wear surface so that they can remain as strengthening features of the friction material composition and provide a wear surface on their ends.

Others objects and advantages of the invention will become more apparent from a detailed description thereof which follows. Reference will be had to the drawings.

DESCRIPTION OF PREFERRED EMBODIMENTS

Figure 1:
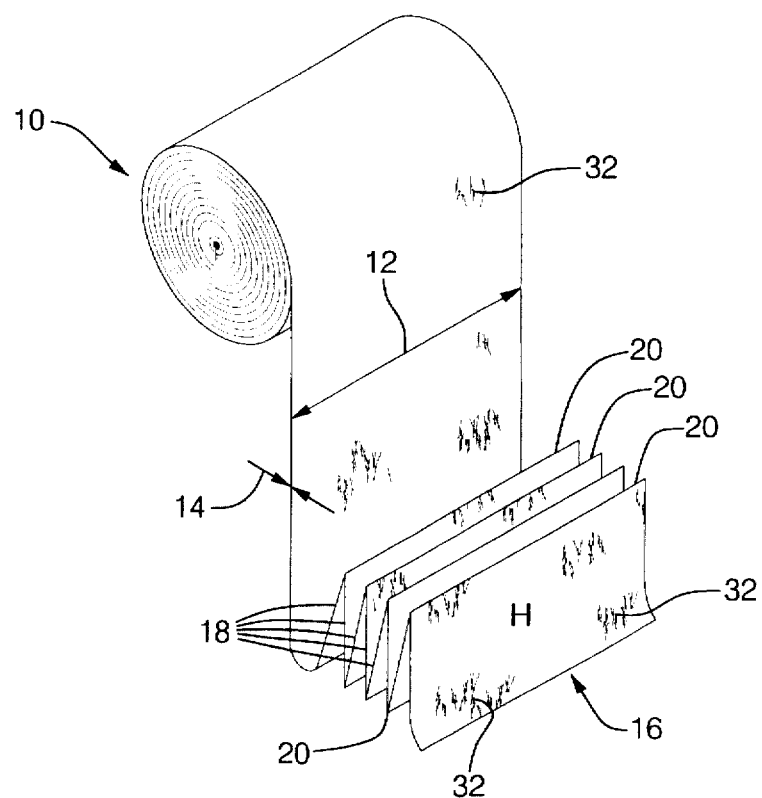
FIG. 1 is a schematic view of a roll of fibrous paper for friction material indicating the folding of the roll as a step in the manufacture of the friction material.

A major feature of this invention is that the fiber content of the friction material product is initially assembled in the form of a paper. The paper is made in the form of a long or continuous sheet with a longitudinal direction, and the incorporation of the fiber content is managed so that it is aligned to the largest practical extent with the longitudinal axis of the paper sheet. The sheet is then folded and/or cut and stacked as will be described in more detail with reference to the drawings so that the folded pleats or cut strips constitute a friction material body in which the fibers are oriented generally perpendicular to the friction surface.

Paper making allows for a broad range of materials selection for the friction material body. Thermally stable fibers can be incorporated into the paper. Short fiber ceramic, carbon, glass, graphite and metals are routinely formed into paper without damage or fracture of the individual fibers. Utilization of these fibers in a paper for a friction material raises the thermal decomposition temperature of the friction material and improves the high temperature wear and friction stability of a brake pad or other friction material body.

Fibers varying in length from several micrometers to one-half inch (12,700 micrometers) can be used in the paper making process in accordance with this invention. The ultimate fiber length is approximately 20 times the length which can be satisfactorily blended by conventional friction material manufacturing process. The increased fiber length potential provides several advantages. It becomes possible to maintain desirable fiber reinforcing length for most materials without resorting to very small diameters and therefore potentially respirable fibers. Many ceramic and carbonaceous fibers that are desirable for friction materials are not available in the small diameters that may be required for conventional processing. Many ceramic fibers ($K_2Ti_8O_{17}$, for example) are not produced in continuous filament and could not readily be incorporated into pultruded structures. Thus, the paper-making feature of this invention allows that the composite strength of the friction material body can be maximized by incorporating a much greater and wider variety of fibers. In addition to the fibers, other particulate material useful in friction materials varying in density and size can be formed into the paper with little or no segregation during the paper-making process. For example, coarse (greater than 500 micrometers) graphite particles are incorporated in automotive friction materials to minimize wear rate. Due to its size, such graphite particles have a propensity to segregate in dry blending methods used in the manufacture of such automotive friction materials. In the subject paper-making practice, multi-filament graphite yarns can be used to simulate the cross-section of the graphite particles, reducing the cost of the formulation. Furthermore, large graphite particles can still be incorporated into friction material papers with virtually no segregation. Any segregation is essentially confined to the thickness of the paper, and such segregation is averaged out when the friction pad is formed by stacking many paper layers.

Finally, the slurry process for making the paper greatly reduces blending times by improving dispersion of fibers, pulps and particles. Dry blending times are reduced from 10 to 20 minutes in conventional friction material mixes to less then one minute in a paper slurry preparation process. Segregation is minimized by the addition of surfactants and controlling both the agitation and viscosity of the paper-making slurry. Dust is virtually eliminated in the manufacturing process.

FIG. 1 schematically illustrates the paper folding or cutting aspects of the subject invention. In FIG. 1, a roll of friction material fiber paper 10 has been made by conventional paper-making activities. Additional examples of the fibers that might be used are found below. However, the roll of a long continuous strip of friction material fiber paper, together with other possible friction material particulate ingredients including binder resin, is shown at 10. The roll has a width dimension 12 that can be any desired practical width but may correspond to a principal dimension (e.g., the width or length) of the friction material article to be produced. The paper also has a thickness dimension 14 which may suitably be in the range of one to three millimeters. As seen in FIG. 1, the strip of paper produced is long and has a longitudinal direction which is parallel to the longest dimension of the strip. As illustrated schematically at 32 in FIGS. 1 and 2, the fibers are aligned parallel to the longitudinal axis of the roll or at an angle within 45 degrees of the longitudinal axis. Also seen in FIG. 1, commencing at the end of the roll of the paper 16, the paper has been folded into a number of pleats 18 with edges 20. As shown, the longitudinal dimension of each pleat 18 is substantially the same.

Figure 2:
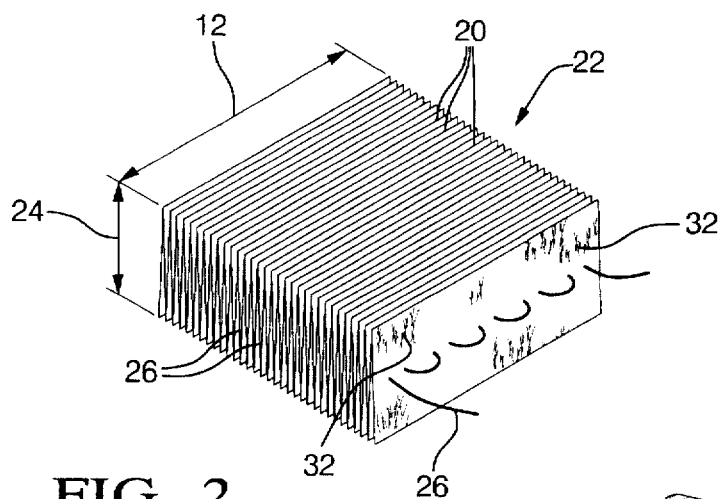
FIG. 2 illustrates a body of the folded paper from FIG. 1 showing its relationship to the dimensions of a finished brake pad.
Figure 3:
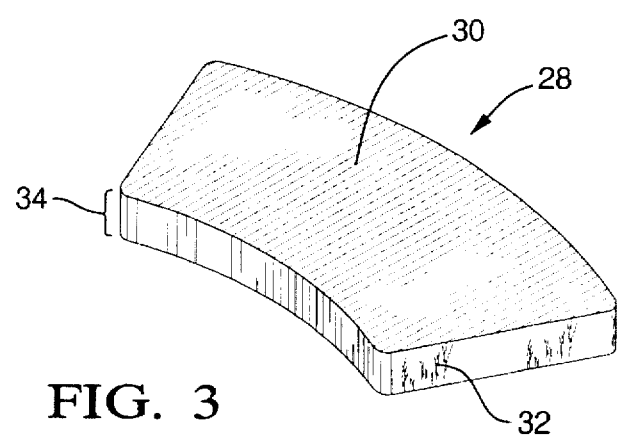
FIG. 3 is a perspective view of a completed brake pad in accordance with the invention.

FIG. 2 shows a portion of a friction material body 22 in the process of being formed by pressing together many pleats 18 from paper roll 10. The length of each pleat is a height or thickness dimension 24 of the body formed from the pressed-together pleats. The body also has a width dimension 12 which initially corresponds to the width of the paper roll 10. The body formed by the folds in the paper can initially be stitched together or needle punched together as indicated by stitches 26. This is for the purpose of the initial and temporary shaping of the folded paper into the shape of a finished body such as the disk brake pad illustrated at 28 in FIG. 3. The majority of the fibers in paper roll 10 were aligned as indicated schematically at 15 within 45 degrees or closer with the longitudinal axis of paper roll 10. Thus, in the article 22 formed by the pressed-together folds, the fibers are now aligned with the edges of the folds 20.

As depicted in FIGS. 1 and 2, the friction body 22 was built up by folding paper 10 and gathering and pressing the pleats 18 together. However, it is apparent that the paper could have been slit across its width and the resulting strips gathered, aligned and pressed together to form body 22.

In a preferred embodiment, the folded and stacked or cut and stacked friction material body 22 is directly hot pressed or molded without stitching.

When the body 22 has been pressed so that the edges are tightly together and the body has been heated so its thermosetting resin content fully bonds the body together, then the composite of all the edges 20 (still shown, but exaggerated in FIG. 3) constitutes an upper surface 30 on the brake pad 28. Reinforcing fibers 32 (shown in FIG. 3 but not readily visible in a finished friction pad 28) are aligned perpendicular to surface 30, regardless of paper stacking direction in the pad. The thickness 34 of pad 28 is the same as the height of the folds 24.

Once the friction pad 28 has been shaped and the thermoset resin cured, the body may be machined if necessary to obtain a final specified shape or dimension. It may also, if necessary, be attached to a backing plate or other component.

Thus, folded or cut and stacked paper felt or fiber bodies permit construction of brake pads and the like with many times the percentage of fibers 32 oriented perpendicular to the wear surface 30 when compared to conventionally molded pads. Depending upon composition and volume friction of fibers, this orientation of fibers will increase friction material wear life over conventional molding processes. The enhanced fiber utilization permits some reduction in organic thermosetting resin content, which is responsible for both increased brake fade and decreased pad wear.

Either during the paper-making process or subsequently when the paper is being folded, other friction material ingredients may be incorporated into the paper or between the folds of the paper for the purpose of constituting a suitable friction material formulation.

It is contemplated that fibers or pulps that are used in the paper-making process may employ, either alone or in combination, glass fibers such as E-, S- and R-type glass fibers. The fibers may be made from mineral glasses such as basalt wool or Rockwool™ and various slag wools. Polymeric fibers such as aramid or polyimide fibers or polyacrylonitrile (whether virgin PAN, oxidized, carbonized or graphitized PAN) fibers may be employed. Pitch-based carbon or graphite fibers may be used. Various types of metal fibers such as copper and low alloy brass and bronze fibers may be used in the paper-making process. Also, ceramic fibers such as the various potassium titanate ceramic fibers, alumina fibers, alumina-silicate fibers, zirconia fibers and zirconium silicate fibers may be used.

In addition to the fibrous content of the paper, resins either as liquids or as finely divided solids can be incorporated in the paper-making slurry or added later. Any of the typical phenolic resins that are used in friction materials can be used in the subject process. Pitch and modified pitch resins may be employed. Polyimide resins, for example, may be employed. Cyanate esters/phenolic triazine resins are also suitable. Fine powders/whiskers can be pre-compounded with resin to increase their retention in the paper.

It is, of course, known to incorporate various abrasive particles such as the various oxides and silicates. Again, zirconia, zircon particles, alumina particles, iron oxide particles and tungsten oxide particles may be used as the abrasive particulate content of the paper. Filler materials such as barium sulfate and calcium carbonate particles may be included. Solid lubricant particles such as molybdenum disulfide, calcium fluoride, molybdenum oxide, tungsten sulfide and various molybdates and tungstates containing a wide variety of cations may be employed. Friction stabilizers such as antimony sulfide and zinc sulfide may be incorporated.

Thus, it is apparent that the subject process permits a higher fiber content while leaving open the opportunity for incorporation of many of the conventionally-employed friction material particles such as those identified above. In accordance with practices of the invention, brake lining materials may be composed of papers that contain friction fibers incorporating together aramid pulp, oxidized polyacrylonitrile, carbonized polyacrylonitrile, glass wool and potassium titanate fiber, and bronze wood fiber where the fiber content is, for example, between 40% and 75% of the total composition. In addition to the fiber content, various oxides such as those mentioned above may be incorporated along with graphite and amorphous carbon lubricating particles. Finally, an amount of thermosetting binder resin such as a phenolic resin mix on the order of 20% to 25% by volume of the formulation may be employed.

While the subject invention has been described in terms of a few specific embodiments thereof, it will be appreciated that other forms may readily be adapted by those skilled in the art. Accordingly, the scope of the invention is to be considered limited only by the following claims.

I claim:

1. A method of forming a friction pad comprising thermosetting resin-bonded reinforcing fibers and having a friction surface with said fibers oriented generally perpendicular to said surface, said method comprising forming a strip of paper having a longitudinal axis and comprising nonwoven reinforcing fibers for said pad, more than half of said fibers being aligned within 45 degrees of said longitudinal axis, forming said paper into a plurality of layers and stacking said layers such that the edges of said layers are aligned to collectively form said friction surface and such that more than half of said fibers are oriented within 45 degrees of being perpendicular to said friction surface, and thereafter bonding said layers together with a thermosetting resin to form said friction body with said friction surface.

2. A method as recited in claim 1 in which said paper is repeatedly folded transverse to its longitudinal axis and a plurality of said folds are gathered such that the folded edges form said friction surface.

3. A method as recited in claim 1 in which said paper is repeatedly cut in a direction transverse to said longitudinal axis and cut pieces are stacked such that a plurality of cut edges are aligned to form said friction surface.

4. A method of forming a friction pad comprising thermosetting resin-bonded reinforcing fibers and having a friction surface with said fibers oriented generally perpendicular to said surface, said method comprising forming a strip of paper having a longitudinal axis and comprising nonwoven reinforcing fibers for said pad and a thermosetting resin interspersed with said fibers, more than half of said fibers being aligned within 45 degrees of said longitudinal axis, forming said paper into a plurality of layers and stacking said layers such that the edges of said layers are aligned to collectively form said friction surface and such that more than half of said fibers are oriented within 45 degrees of being perpendicular to said friction surface, and thereafter pressing said selected layers together and heating them to bond them together with said thermosetting resin to form said friction body with said friction surface.

5. A method as recited in claim 4 in which said paper is repeatedly folded transverse to its longitudinal axis and a plurality of said folds are gathered such that the folded edges form said friction surface.

6. A method as recited in claim 4 in which said paper is repeatedly cut in a direction transverse to said longitudinal axis and cut pieces are stacked such that a plurality of cut edges are aligned to form said friction surface.

7. A friction pad comprising a friction surface and a plurality of stacked layers of paper each having a longitudinal direction and comprising nonwoven reinforcing fibers aligned within 45 degrees of said direction, the edges of said stacked layers being aligned to collectively form said friction surface with said fibers being oriented generally perpendicular to said surface, said stacked layers being bonded together with a thermoset resin to form said pad.

* * * * *